April 9, 1957        J. A. MASON        2,788,104

CONTROL APPARATUS FOR ELECTRO-MAGNETIC FRICTION CLUTCH

Filed Oct. 17, 1952        2 Sheets-Sheet 1

INVENTOR.
JAMES A. MASON
BY
Norman S. Blodgett
ATTORNEY

April 9, 1957  J. A. MASON  2,788,104
CONTROL APPARATUS FOR ELECTRO-MAGNETIC FRICTION CLUTCH
Filed Oct. 17, 1952  2 Sheets-Sheet 2

INVENTOR.
JAMES A. MASON
BY Norman S. Blodgett
ATTORNEY

United States Patent Office 2,788,104
Patented Apr. 9, 1957

2,788,104

CONTROL APPARATUS FOR ELECTRO-MAGNETIC FRICTION CLUTCH

James A. Mason, Shrewsbury, Mass., assignor to Machinery Electrification, Inc., Worcester, Mass., a corporation of Massachusetts Application October 17, 1952, Serial No. 315,278

8 Claims. (Cl. 192—84)

This invention relates generally to clutch control apparatus and more particularly to an electrical control circuit for use with an electro-magnetic friction clutch.

In driving a load by means of a constant-speed motor through a clutch, it is difficult to bring the load up to speed evenly. This problem becomes particularly important in such applications as wire- and tube-drawing wherein sudden increases in speed during the acceleration period can cause the material to be snapped. The difficulties are particularly great when the clutch to be used is of the electro-magnetic friction type; this clutch is so constructed that the power transmission takes place between friction surfaces which are drawn together by electro-magnetic forces set up by the passage of current through coils in one of the elements of the clutch. Although this clutch has many advantages, it has been difficult to regulate its speed since it is not possible to control slip merely by adjusting the current passing through the coil. The present invention obviates the difficulties experienced in the prior art in a novel manner.

An outstanding object of this invention, therefore, is the provision of apparatus whereby the amount of slip between the driving and driven elements of an electro-magnetic friction clutch may be regulated.

Another important object of the present invention is the provision of apparatus for controlling a clutch so that it brings its load to a predetermined speed at a controlled rate.

It is a further object of the invention to provide an apparatus for controlling the slip of an electro-magnetic friction clutch having a driven and a driving member by the use of pulsed current.

Another object of the instant invention is the provision of a method of controlling the slip of an electro-magnetic friction clutch within very close limits.

A still further object of the invention is the provision of an electrcal circuit for the "on-off" or pulsing control of a clutch of the type described.

Another object of this invention is the provision of a novel circuit for controlling the reference voltage in clutch control apparatus.

Other objects and advantages of the invention will become apparent from the following detailed description taken in connection with the accompanying drawings, in which.

Figure 1:
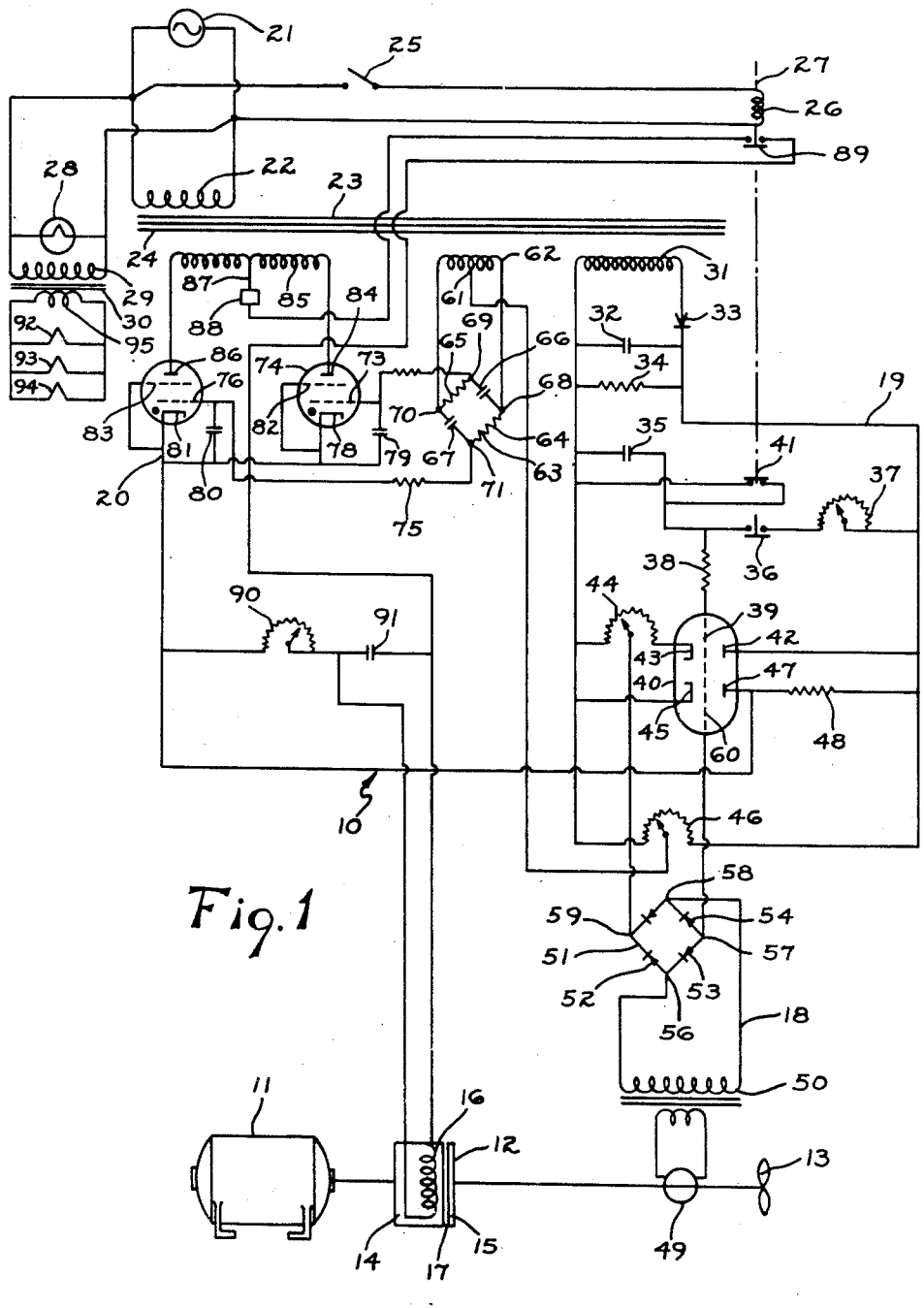
Fig. 1 illustrates diagrammatically one embodiment of the present invention.

The present invention involves broadly the concept of controlling the current passing through the coils of a clutch in response to a signal indicative of the speed of the load side of the clutch and by regulating the amount of control which the said signal has over the current passing through the coils by means of an adjustable regulator. A tachometer generator is driven by the load or output shaft of the clutch. This generator signal is rectified and is opposed by a reference signal of opposite polarity originating in the regulator circuit. The regulator circuit produces a reference voltage proportional to the desired speed of the output shaft of the clutch at any given time. It contains a time-delay section that permits the reference signal to increase at a definite rate during a predetermined period to a value indicative of the desired normal running speed. The period of acceleration and the running speed are selectively controllable within the regulator. It can be seen, then, that the difference between the rectified tachometer generator signal and the reference signal from the regulator at any given time represents the amount that the speed of the output shaft of the clutch differs from the desired speed. This differential signal is amplified and is then used to control the current output of a pair of thyratrons connected for full-wave operation, this output passing through the coils of the clutch. More specifically, the differential signal is used to bias an alternating potential on the control grid of the thyratrons, thus shifting the point of firing.

The regulator or reference voltage circuit operates basically by means of the charging of a capacitor. The capacitor is charged through an adjustable resistor in series therewith, the setting of the resistor controlling the current passing therethrough and into the capacitor and, thus, controlling the charging rate of the capacitor. The voltage appearing across the capacitor is impressed on the grid of a triode which is connected as a cathode follower, the cathode resistor of the cathode follower being a potentiometer, the center tap of which is connected to one side of the rectifier of the tachometer generator signal. The other side of the rectifier is connected to the grid of an amplifier triode. One end of the potentiometer is connected to the cathode of the cathode follower triode while the other end is connected to the plate voltage source and to the cathode of the amplifier triode. As the condenser charges up and raises the potential of the cathode follower grid, more current will pass through the potentiometer and a larger voltage will appear across the sections of the potentiometer. The rectifier and the potentiometer are connected with their polarities in opposition, so that the amplifier triode grid will be biased by a voltage equal to the difference between the rectified generator voltage and the voltage across one section of the cathode follower potentiometer. This grid bias voltage is amplified in the amplifier triode and appears across the plate resistor as an amplified voltage which is proportional to the difference between the actual speed and the desired speed of the output side of the clutch at any given moment. This is the voltage that is used to control the thyratrons. An alternating voltage is impressed on the control grid of the thyratrons and this voltage is moved out of phase with the plate voltage to bring about firing during only a portion of the cycle; the direct-current voltage originating in the amplifier triode plate resistor is combined with this alternating voltage to bias it, the amount of bias being equal to the value of the direct-current voltage. It can be seen, then, that changes in the value of bias due to changes in the value of the direct-current voltage will change the point of firing, thus changing the length of the time of firing and the output current of the thyratrons.

Referring now to Fig. 1 of the drawings, the apparatus of the invention, designated generally by the reference numeral 10, is shown as comprising a motor 11, an electromagnetic friction clutch 12, and a load 13. The motor is connected to the usual source of electrical power by switches and related gear, not shown. The clutch 12 consists of a driving member 14 which is directly connected to the motor and a driven member 15 which is directly connected to the load 13. The driving member is provided with coils 16 through which electrical current may be passed to actuate the clutch. There is very little inductive reactance in the coil 16 and its associated members and there is also very little lag between the time that electro-magnetic lines of force are set up in the driving member 14 and the time that the clutch members are drawn into power-transmitting, frictional contact; this means that the transmission of power through the clutch 12 takes place almost immediately after current starts to pass through the coil 16. It also means that power transmission will stop almost immediately after the current in the coil stops, since the low inductance permits a rapid decay of the electro-magnetic lines of force. Since the actual power transmission takes place by friction between the adjacent faces of the driving and driven members, it is possible with this type of clutch to control the transmission of large quantities of power with a small current in the coils. Furthermore, a small variation in coil current changes the frictional contact tremendously and, thus, changes the amount of slip by a very great amount; the clutch, therefore, is very sensitive to regulation of the coil current.

The apparatus of the invention further includes a tachometer section 18, a regulator section 19, and a rectifier section 20. A source of alternating current 21 is connected across the primary coil 22 of a transformer 23 having a core 24. Connected across the source of current 21 and in series with each other are a switch 25 and the coil 26 of a relay 27. Also connected across the source of current 21 is a tube 28 of a normally-open time delay relay 88 having a delay time of 10 to 20 seconds; the primary coil 29 of a filament transformer 30 is connected across this time delay relay tube 28.

A secondary coil 31 of the transformer 23 is connected at one end to one side of a filter capacitor 32 and at the other end to one side of a rectifier 33. The other side of the rectifier is connected to the other side of the capacitor. A resistor 34 is connected across the capacitor 32. Across the resistor 34 and in series with one another are a capacitor 35, a normally-open contactor 36 of the relay 27, and a variable resistor 37. The movable contact arm of the variable resistor is connected to one end of the resistor element and serves to short out a selected portion thereof. The contact arm is also connected to the common point of the rectifier 33, the capacitor 32 and the resistor 34. The common point of the capacitor 35 and the contactor 36 is connected through a resistor 38 to a grid 39 of a twin triode vacuum tube 40. A normally-closed contactor 41 of the relay 27 is connected across the capacitor 35. The contact arm of the variable resistor 37 is connected to the plate 42 in the same triode section of the tube 40 as the grid 39. The cathode 43 of this triode section is connected to one end of the resistor element of a potentiometer 44. The other end of the resistor element is connected to the common point of the transformer secondary coil 31, the capacitor 32, the resistor 34, the capacitor 35, and the contactor 41. The other end of the resistor element is also connected directly to the cathode 45 of the other triode section of the vacuum tube 40; it is also connected to one end of the resistor element of a potentiometer 46, the other end of which is connected to the plate 42. The plate 47 of the second triode of the tube 40 is joined through a resistor 48 to the plate 42 and the other end of the resistor element of the potentiometer 46.

A tachometer generator 49 is driven by the shaft which connects the driven member 15 of the clutch 12 to the load 13. This generator is connected to give a voltage which is proportional to the rate of rotation of the shaft. The output terminals of the generator are joined to the primary of an amplifying transformer 50, the secondary of which is connected to a rectifier bridge 51. The bridge 51 is composed of four rectifiers 52, 53, 54 and 55 which are connected in series and which have common junction 56, 57, 58 and 59. The rectifiers are connected so that current can flow through rectifier 52 only from junction 56 to junction 59, through rectifier 53 only from junction 57 to junction 56, through rectifier 54 only from junction 57 to junction 58, and through rectifier 55 only from junction 58 to junction 59. The ends of the secondary coil of the transformer 50 are connected to the junctions 58 and 56 of the bridge 51. The junction 57 is connected to the grid 60 of the second triode section of the vacuum tube 40. The junction 59 is connected to the movable contact arm of the potentiometer 44.

The movable contact arm of the potentiometer 46 is connected to the fixed center tap 61 of a secondary coil 62 of the transformer 23. The outer ends of the coil 62 are connected to a 90 degree phase shifter 63. The phase shifter is formed of two resistors 64 and 65 and two capacitors 66 and 67. One side of the resistor 64 and one side of the capacitor 66 form a junction 68, one side of the resistor 65 and the other side of the capacitor 66 form a junction 69, one side of the capacitor 67 and the other side of the resistor 65 form a junction 70, and the other side of the resistor 64 forms a junction 71 with the other side of the capacitor 67. The ends of the secondary coil 62 are connected to the junctions 68 and 70. The junction 69 is connected through a resistor 72 to the grid 73 of a negative control gas tetrode thyratron 74; the junction 71 is connected through a resistor 75 to the grid 76 of a similar thyratron 77. The grid 73 of the thyratron 74 is connected to the cathode 78 through a capacitor 79 and the grid 76 of the thyratron 77 is connected through a capacitor 80 to the cathode 81. The cathode 78 of the thyratron 74 is directly connected to the cathode 81 of the thyratron 77. The cathode 78 of the thyratron 74 is also directly connected to the screen 82, while the cathode 81 of the thyratron 77 is similarly connected to the screen 83. The anode 84 of the thyratron 74 is connected to one end of a secondary coil 85 of the transformer 23, while the other end of the coil is connected to the anode 86 of the thyratron 77. A center tap 87 of the coil 85 is connected to a time delay relay 88, the actuating tube of which is the tube 28 whose filament is connected across the power source 21 as has been described hereinbefore. The other side of the relay 88 is connected to one side of a contactor 89 of the relay 27; the relay 88 serves to form a continuous conductive path from the center tap 87 to the contactor 89 only after a predetermined time interval has passed after the thyratrons 74 and 77 begin firing. The other side of the contactor 89 is connected to one side of the coil 16 of the clutch 12. The cathodes 78 and 81 of the thyratrons are connected to one side of the resistance element of a variable resistor 90 and they are also connected to the plate 47 of the vacuum tube 40. The movable contact arm of the variable resistor 90 is connected to the other side of the coil 16. A capacitor 91 is connected across the coil 16. The filaments 92, 93 and 94 of the vacuum tube 40, the thyratron 74, and the thyratron 77, respectively, are connected in parallel across the secondary coil 95 of the filament transformer 30.

An example of an operative apparatus embodying the invention resides in a construction using the following engineering data:

| | |
|---|---|
| Transformer 23 | XB plate transformer. |
| Transformers 30 and 50 | 110/6.3 filament transformers. |
| Relay 88 | Time delay relay (10–20 sec., 110 v. A.-C. heater). |
| Relay 27 | Potter and Brumfield relay KRP11A (110 v. A.-C.). |
| Thyratrons 74 and 77 | Type 2050. |
| Tube 40 | Type 6SN7. |
| Rectifier 33 | Selenium ½-wave rectifier 65 ma. (110 v. A.-C.). |
| Rectifiers 52, 53, 54 and 55 | 65 ma., 110 v. A.-C., ½-wave. |
| Resistors 72 and 75 | 47,000 ohm, 1 watt. |
| Resistors 63 and 65 | 20,000 ohm, 1 watt. |
| Resistor 34 | 47,000 ohm, 1 watt. |
| Resistor 38 | 0.1 metohm, 1 watt. |
| Resistor 48 | 100,000 ohm, 1 watt. |
| Potentiometer 37 | 5 metohm. |
| Potentiometers 44 and 46 | 50,000 ohm. |
| Potentiometer 90 | 1000 ohm, 50 watt rheostat. |
| Capacitors 79 and 80 | 0.001 mfd. |
| Capacitors 66 and 67 | 0.15 mfd. |
| Capacitor 32 | 10 mfd. dry electrolytic filter condenser (250 v. D.-C.) |
| Capacitor 35 | 2 mfd., 250 v. D.-C. |
| Capacitor 35 | 1 mfd., 600 v. D.-C. |

The operation of the apparatus will be evident from the above description. The motor 11 is started in the usual manner. The closure of the switch 25 permits current from the source 21 to pass through the coil 26 of the relay 27; the actuation of the relay closes the contactor 89, opens the contactor 41, and closes the contactor 36. Current is permitted to pass therethrough from the center tap 87 of the secondary coil 85 through the contactor 89 to the coil 16 of the clutch. The passage of current through the coil 16 causes the driving member 14 of the clutch to make increased frictional contact with the driven member 15 whereupon the load is picked up. The rotation of the shaft connecting the clutch to the load 13 causes the tachometer generator to generate an alternating current, the magnitude of which is proportional to the rate of rotation of the shaft. The passage of this current through the primary of the transformer 50 induces a current in the secondary at a substantially increased voltage and this signal is impressed on the junctions 56 and 58 of the rectifier bridge 51.

The passage of current from the source 21 through the primary coil of the transformer induces a current in the secondary coils 85, 62 and 31. Current passing through the secondary coil 31 is rectified by the rectifier 33 and filtered in the network formed by the capacitor 32 and the resistor 34. The resulting voltage across the outer ends of the branch formed by the capacitor 35, the contactor 36, and the variable resistor 37. Since the contactor 36 is closed, current passes through the resistor and the contactor into the capacitor, whereupon a charge accumulates therein and a voltage corresponding to the quantity of the charge appears across the capacitor. At this point it should be noted that opening the switch 25 releases the relay 27 and closes the contactor 41; the closing of the contactor 41 shorts the capacitor 35 and discharges it. In any case, the voltage across the capacitor appears on the grid 39 of the vacuum tube 40. The voltage on the grid 39 determines the flow of current from the plate 42 to the cathode 43, which current passes through the potentiometer 44. The voltages appearing across the sections of the potentiometer are proportional to the current passing therethrough, and one such voltage is impressed on the junction 59 of the bridge 51. The junction 57 is connected to the grid 60, so that the voltage appearing on that grid represents the difference between the signal originating in the tachometer generator 49 and that originating across the capacitor 35. The value of this difference is determinative of the plate current in the triode section formed by the plate 47, the grid 60, and the cathode 45. This plate current passes through the resistor 48 creating a voltage thereacross proportional to the current. This voltage is taken by means of the movable contact arm of the potentiometer 46 which has been set to the critical firing point (X) on Fig. 2, and is impressed on the center tap 61 of the secondary coil 62 of the transformer 23. Since the voltage induced in the coil is alternating and the voltage originating in the resistor 48 is unidirectional and changes value relatively slowly, the net effect is that the voltage from the resistor 48 raises and lowers the mean value of the resulting voltage envelope. The resulting alternating voltage is impressed on the junctions 68 and 70 of the phase shifter 63. The output voltage of the shifter, which is 90 degrees out of phase with the input, is taken from the junctions 69 and 71, these points being at equal potential, and impressed on the grids 73 and 76 of the thyratrons 74 and 77, respectively. Alternating current originating in the secondary coil 85 of the transformer 23 is impressed across the plate 84 and the cathode 78 of the thyratron 74 and across the plate 86 and the cathode 81 of the thyratron 77. The grid voltage determines the point in the cycle of plate voltage that the tube "fires" or becomes conductive; it is thus possible, by raising and lowering the grid bias, to regulate the duration of pulses of current produced by the conductive periods of the thyratrons. The thyratrons are connected for full-wave rectification and the rectified pulses flow from the center tap 87 through the time delay relay 88, if the selected delay time has passed after the initiation of the apparatus, through the contactor 89, the coil 16 of the clutch, and through the variable resistor 90 to the cathode sides of the thyratrons. The time delay relay 88 assures that the thyratrons are at operating temperature and that the regulator section 19 and the tachometer section 18 have gained control over the thyratrons before the output of the thyratrons is permitted to pass through the clutch coil.

Because of the fact that the current flowing into the capacitor 35 determines the rate of charge thereof, the total charge determines the voltage across the capacitor, and the fact that the current so flowing depends on the setting of the variable resistor 37, it is possible to control the length of time required for the load to be brought up to speed by adjusting the variable resistor 37. Increasing the charge on the capacitor 35 slowly by use of a large portion of the resistor causes the voltage on the grid 39 to rise slowly also, thus slowly increasing the reference voltage appearing across the potentiometer 44. Since the apparatus is constructed to cause the tachometer generator signal to follow the reference voltage, the load speed will be increased slowly in accordance with the rate of charging of the capacitor 35.

The final speed to which the driven member 15 of the clutch rises and, consequently, the final speed of the load may be determined by adjustment of the movable contact arm of the potentiometer 44. This adjustment of the potentiometer determines the portion of the voltage which appears across the potentiometer that will be effective as a reference voltage to be compared at the bridge 51 with the modified tachometer generator signal.

Another adjustment in the apparatus is available in the movement of the contact arm of the potentiometer 46. The voltage which appears across the entire potentiometer represents the full voltage across the secondary coil 31 as rectified. By properly selecting the portion of the voltage appearing across the potentiometer 46 that is to be effective at the center tap of the coil 62, it is possible, in effect, to raise and lower the average bias on the grids 73 and 76 and, thus, to select the average firing point of the thyratrons. Once this has been adjusted for a given apparatus, it will be left at that setting during normal operation.

At any given time during the starting cycle and any time during normal operation, a definite reference voltage originating in the regulator section appears at the junction 59 of the bridge 51. Now, if the signal originating in the tachometer generator 49 and amplified in the transformer 50 is different from the reference voltage, its application across the junctions 56 and 58 will cause a voltage to appear at the junction 57 which is equal in magnitude to the difference between the reference voltage and the speed-determined voltage and which has a polarity dependent on whether the speed is greater or less than it should be. If the rate of rotation of the driven member 15 of the clutch and of the load is less than it should be, the voltage appearing at junction 57 will be lowered. This will have the effect of lowering the bias on the grid 60, lowering the plate current of its triode, lowering the voltage appearing across the plate resistor 48, and lowering the average value of the alternating current on the coil 62. This means that, when the alternating current is phase shifted, it will produce a lower value of alternating bias potential which, when applied to the grids 73 and 76 of the thyratrons, will cause the thyratrons to fire sooner in the cycle of alternating plate voltage. Thus, the length of the firing period of the thyratron will be increased and longer pulses of current will be passed into the clutch coil 16. This will increase the degree of frictional contact between the driving and the driven members of the clutch. That results in the speed of the driven member more nearly approaching that of the driving member and the speed of the load will increase accordingly, which is what is desired, since the load was rotating slower than it should. A similar action takes place, of course, to correct the situation wherein the load is rotating faster than it should.

The capacitor 91 is inserted across the clutch coil 16 to absorb the reverse electromotive force originating in the coil when the current is dropped suddenly. If this charge were not absorbed, it would pass back to the thyratrons and would reverse and raise the plate voltage so that it would not stop firing even though the grid had dropped to a value below the normal critical value. Without the capacitor, the conductance of the thyratrons would decrease slowly instead of stopping quickly as is necessary in the present "stop-start" apparatus. Needless to say, the sensitivity of the apparatus would be dulled if the thyratrons did not shut off quickly.

Figure 2:
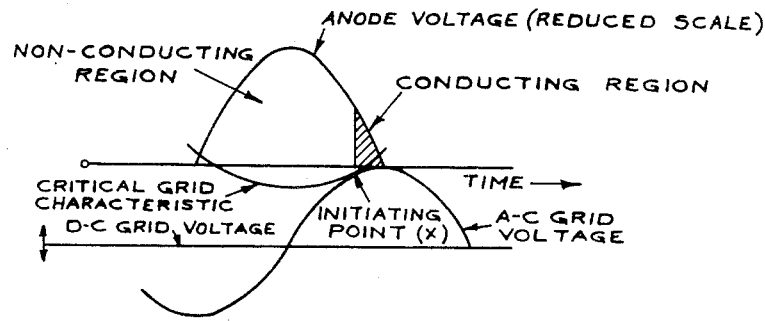
Figs. 2 and 3 are graphical representations of the manner of operation of a portion of the apparatus.
Figure 3:
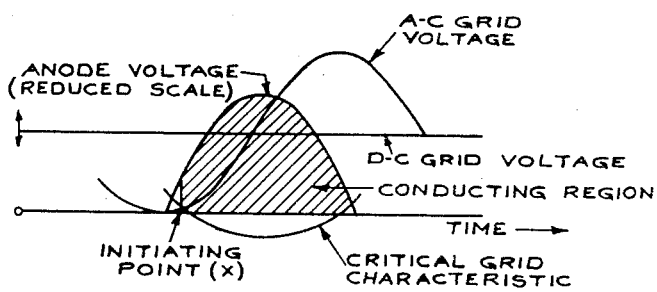

The manner in which the thyratrons 74 and 77 are controlled is shown in Figs. 2 and 3. Because of the inherent characteristics of the thyratron, it will fire at a given plate voltage only when the grid is biased above a certain critical value; this value varies non-linearly with the plate voltage and is shown in the drawings as the critical grid characteristic. At any point on the anode voltage curve, the critical grid voltage resides vertically below it on the critical grid characteristic curve. It stands to reason, then, that if a varying voltage is impressed on the grid, the tube will start firing if and when the curve of this voltage rises to intersect the critical grid characteristic curve. In the present invention, the voltage impressed on the grid is an alternating current voltage having the same cycle length as the anode voltage, but shifted in phase by 90 degrees. By shifting the D.-C. component of the grid voltage up and down, the point of firing may be varied. The advantage of this method of controlling the firing of the thyratron is that the A.-C. component of the grid voltage always intersects the critical grid characteristic curve at a sharp angle; this means that very accurate control of the point of firing is possible. Small variations in the alternating component of the grid voltage do not affect the point of firing and, thus, the output current of the thyratron is relatively stable and is not subject to variations in the power source. However, small variations of the D.-C. component of the grid voltage do produce substantial changes in the point of firing, as is evident from an examination of the drawings. Thus, variation in the supply voltage will affect the clutch operation very little, but the apparatus will be very sensitive to voltage originating in the control circuit. This characteristic of the apparatus may be enhanced by the use of a voltage regulator connected across the secondary coil 31 in the well-known manner.

Figure 4:
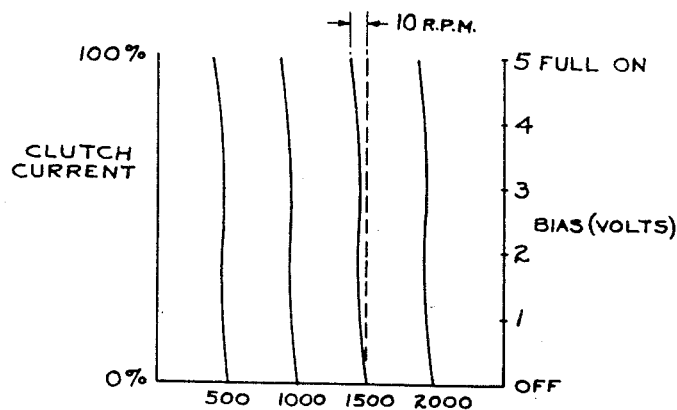
Fig. 4 is a graphical representation of the operation of the apparatus.

It is to be noted that certain characteristics of the apparatus combine in an unusual way to give very close control over the output speed of the clutch. To begin with, the tachometer generator voltage is greatly amplified and is compared with a reference voltage of a high value. This means that any difference between the two will have a high magnitude. The difference is amplified further before being used to control the thyratrons. The result is that small changes in speed of the load produce large changes in the control voltage. Furthermore, as has been discussed above, the manner of controlling the thyratrons is such that small changes in the control voltage, i. e., the D.-C. component of the grid voltage, produces large changes in the length of the pulses of output current of the thyratrons; this is accomplished, as has been stated, without making the operation unduly sensitive to variation in the alternating current coming from the power source. Lastly, the electromagnetic friction clutch itself is extremely sensitive to any change in the length of the pulses of current in its coil because of the fact that a small increase in pulse length and in magnitude of current, for instance, causes the friction faces to approach each other a very small amount and remain in that position longer, which amount is sufficient to increase the frictional forces tremendously and decrease the slip by a large amount. The net result of the particular combination of elements in the apparatus of the invention is an extremely sensitive control of the rate of rotation of the load. Fig. 4 shows a family of curves representative of the operation of the invention. The steepness of the curves is indicative of the sensitivity of control. As is evident from the drawing, a change in speed of only 10 R. P. M. is sufficient to change the clutch current from full current to zero.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention having been thus described, what is claimed as new and desired to secure by Letters Patent is:

1. An apparatus for driving a load, comprising: a constant speed electric motor, an electromagnetic friction clutch connecting the motor to the load, the said clutch having a coil for the actuation thereof, a source of alternating current power, a thyratron having a grid and having a plate circuit which has an alternating voltage from the said source impressed thereacross, alternating voltage from said source being impressed on the grid of the said thyratron, a phase shifter connected to cause the voltage on the grid to be 90 degrees out of phase with the voltage across the plate circuit, a regulator deriving its power from the said source, said regulator providing a reference voltage, a tachometer generator associated with the load and providing a voltage signal proportional to the speed of the load, and means for obtaining the difference between the generator voltage signal and the reference voltage and combining it with the alternating voltage on the grid of the thyratron.

2. A control circuit for an electromagnetic friction clutch having an output side and an actuating coil, comprising: a source of alternating current electricity, a thyratron having a grid and having a plate circuit which is connected to said source and to the coil of the clutch, a phase shifter connected to the grid of the thyratron and to the source, a rectifying bridge connected to the shifter, a tachometer generator associated with the output side of the clutch attached to the bridge for impressing thereon a signal voltage proportional to the speed of the output of the clutch, a regulator connected to the source and to the bridge for impressing thereon a reference voltage, the said regulator being adjustable to control the rate of increase of said reference voltage from zero during starting of transmission of power through the clutch and being further adjustable as to the value of the reference voltage which will be maintained during normal running of the clutch.

3. Control apparatus for an electromagnetic friction clutch having a driving member, a driven member, and an actuating coil, comprising: an alternating current supply, at least one rectifier tube energized from the said supply to supply direct current to said coil, a control grid in the tube, a phase shifter receiving alternating current from said supply, said shifter being adapted to apply an alternating bias to said grid to control the action of said tube in exciting said coil, a regulator receiving alternating current from said supply and providing a reference voltage, a tachometer generator connected with said driven member and providing a signal indicative of the angular velocity thereof, a bridge to which the regulator and the generator are operatively connected, the direct current output of the bridge being impressed on the phase shifter to be impressed on the grid of the tube.

4. Control apparatus for an electromagnetic friction clutch having a driving member, a driven member, and an actuating coil, comprising: an alternating current supply, at least one thyratron energized from said supply to supply direct current to said coil, a tachometer generator connected with said driven member and providing a signal indicative of the angular velocity thereof, and a regulator providing a reference voltage to be combined with the generator signal for controlling the thyratron, the regulator receiving alternating current from said supply and having a rectifying and filtering circuit for converting the alternating current to direct current, a capacitor and a variable resistance connected in series with each other and being connected across the output of the said circuit, a triode and a potentiometer also connected across the output of the circuit, the triode having an anode, a cathode and a grid, the potentiometer being connected on one side to the cathode of the triode and on the other side to one side of the output of said circuit, the anode of the triode being connected to the other side of the output of the circuit, the grid of the triode being connected to the capacitor and the variable resistor at a point where they are connected, the said potentiometer having a movable contact arm which furnishes the reference voltage.

5. Control apparatus for an electromagnetic friction clutch having a driving member, a driven member and an actuating coil, comprising: an alternating current supply, at least one thyratron energized from said supply to supply direct current to said coil, a tachometer generator connected with said driven member, said generator having output terminals and providing a signal indicative of the angular velocity of the driven member, an amplifying transformer having a primary coil connected to the said terminals, a regulator providing a reference voltage to be combined with the generator signal for controlling the thyratron, the regulator receiving alternating current from said supply and having a rectifying and filtering circuit for converting the alternating current to direct current, a capacitor and a variable resistance connected in series with each other and across the output of said circuit, a triode connected as a cathode follower across the output of said circuit, a resistor from the grid of the triode a point where the capacitor and the variable resistor are connected, a potentiometer acting as the cathode resistor of the triode and having a movable contact arm for selecting a portion of the voltage appearing thereacross, a rectifier bridge to which the secondary of the amplifying transformer and the contact arm of the potentiometer are connected, the bridge being so connected that its output represents the rectified difference between the amplified generator signal and the reference, an amplifying tube having a grid to which the output of the bridge is connected, a second potentiometer through which is passed the plate current of the said amplifying tube whereby a portion of the voltage appearing thereacross may be selected for controlling the said thyratron.

6. Control apparatus for an electromagnetic friction clutch having a driving member, a driven member and an actuating coil, comprising: a supply transformer having a primary coil which is connected to a source of alternating current, a first secondary of said transformer, at least one thyratron having a grid and having a plate circuit into which the first secondary is connected, the actuating coil of the clutch being also connected in the plate circuit of the thyratron, a second secondary of said transformer, a phase shifter connected across said second secondary and having an output which is connected to the grid of the thyratron, a third secondary of the transformer, a rectifying and filtering circuit connected across the third secondary, a capacitor and a variable resistance connected in series with each other across the output of the circuit, a triode having a grid and being connected as a cathode follower across the output of said circuit, a fixed resistor connecting the grid of the triode to a point where the capacitor and the variable resistor are connected, a potentiometer acting as the cathode resistor of the triode and having a movable contact arm for selecting a portion of the voltage appearing thereacross, a tachometer generator connected with said driven member and having output terminals providing a signal indicative of the angular velocity thereof, an amplifying transformer having a primary connected across the said output terminals, a rectifier bridge to which the secondary of the amplifying transformer and the contact arm of the potentiometer are operatively connected, the bridge being so connected that its output represents the difference between the modified generator signal and the reference voltage appearing on the contact arm of the potentiometer, an amplifying tube having a plate circuit and having a grid on which is impressed the output of the bridge, a second potentiometer in the plate circuit of the said amplifying tube and having a contact arm which is connected to a center tap of the second secondary of the transformer for providing a direct current component in the signal appearing on the control grid of the thyratron.

7. A control circuit for an electromagnetic friction clutch having an actuating coil, comprising: a thyratron having a grid and having a plate circuit in which is connected the coil of the clutch, a phase shifter connected to the grid of the thyratron and to a source of alternating current electricity, a rectifying member connected to the shifter, a tachometer generator which is associated with the clutch and which is attached to the rectifying member for impressing thereon a voltage proportional to the speed of the load side of the clutch, a regulator connected to the member for impressing thereon a reference voltage, the said regulator being adjustable to control the rate of increase of said reference voltage from an initial value during the starting of the transmission of power through the clutch and being further adjustable as to the value of the reference voltage which will be maintained during normal running of the clutch.

8. Speed control means for the output shaft of a machine driven at a substantially constant speed by a prime mover through the medium of an electromagnetic friction clutch having a driven member, a driving member and an actuating coil, comprising a tachometer generator coupled with the driven member of said clutch, a regulator providing a reference voltage with which a signal voltage from the generator is compared, a thyratron having an output circuit which is connected to the coil of said clutch, means connected to the grid of the thyratron for impressing thereon an alternating voltage which is 90 degrees out of phase with the plate voltage thereof, and means for combining with the said alternating voltage on the grid a unidirectional voltage indicative of the difference between the generator voltage and the reference voltage.

References Cited in the file of this patent

UNITED STATES PATENTS

| | | |
|---|---|---|
| 1,814,424 | Barr | July 14, 1931 |
| 2,393,701 | Moyer | Jan. 29, 1946 |
| 2,449,779 | Jaeschke | Sept. 21, 1948 |
| 2,469,706 | Winther | May 10, 1949 |
| 2,470,103 | Lochman | May 17, 1949 |
| 2,523,046 | Montgomery | Sept. 19, 1950 |
| 2,609,181 | Jaeschke | Sept. 2, 1952 |
| 2,747,710 | Smith | May 29, 1956 |

FOREIGN PATENTS

| | | |
|---|---|---|
| 4,849A | Great Britain | 1906 |